(12) United States Patent
Van De Geer et al.

(10) Patent No.: US 7,954,898 B2
(45) Date of Patent: Jun. 7, 2011

(54) SELF-COMPENSATING MECHANICAL LATCH

(75) Inventors: Bernardus W. G. Van De Geer, Nol (SE); Erik O. Pettersson, Bankeryd (SE)

(73) Assignee: Fisher & Company, Incorporated, St. Clair Shores, MI (US)

( * ) Notice: Subject to any disclaimer, the term of this patent is extended or adjusted under 35 U.S.C. 154(b) by 0 days.

(21) Appl. No.: 12/044,268

(22) Filed: Mar. 7, 2008

(65) Prior Publication Data

US 2008/0203800 A1   Aug. 28, 2008

Related U.S. Application Data

(63) Continuation of application No. PCT/US2006/035317, filed on Sep. 12, 2006.

(60) Provisional application No. 60/716,379, filed on Sep. 12, 2005.

(51) Int. Cl.
*B60N 2/02* (2006.01)

(52) U.S. Cl. ............. 297/378.13; 297/376; 292/200; 292/216

(58) Field of Classification Search ........... 297/375, 297/377, 378.12, 378.13; 292/194, 216, 292/219, 226, 200
See application file for complete search history.

(56) References Cited

U.S. PATENT DOCUMENTS

| | | | | |
|---|---|---|---|---|
| 2,859,995 A * | 11/1958 | Rigaud | ............................. | 292/53 |
| 3,767,243 A * | 10/1973 | Yoshimura | .................... | 292/216 |
| 3,985,381 A * | 10/1976 | Kobayashi | .................... | 292/216 |
| 4,172,768 A * | 10/1979 | Cerdan | ........................ | 292/216 |
| 4,591,207 A * | 5/1986 | Nithammer et al. | .......... | 297/366 |
| 4,765,682 A * | 8/1988 | Satoh | ........................ | 297/378.13 |
| 5,118,146 A * | 6/1992 | Watanuki | ....................... | 292/216 |
| 5,566,431 A * | 10/1996 | Haglund | .......................... | 24/633 |
| 5,730,480 A | 3/1998 | Takamura | | |
| 6,123,379 A * | 9/2000 | Yamada et al. | ............. | 296/65.03 |
| 6,412,849 B1 | 7/2002 | Fast | | |
| 6,698,837 B2 * | 3/2004 | Pejathaya et al. | ........ | 297/378.12 |
| 6,715,841 B2 | 4/2004 | Christoffel et al. | | |
| 6,733,078 B1 | 5/2004 | Zelmanov | | |
| 6,902,237 B2 | 6/2005 | Petry | | |
| 7,044,552 B2 * | 5/2006 | Muller et al. | ................ | 297/336 |
| 7,152,926 B2 | 12/2006 | Wrobel | | |
| 2003/0042780 A1* | 3/2003 | Klein et al. | ................... | 297/367 |
| 2005/0269854 A1 | 12/2005 | Lutzka et al. | | |

OTHER PUBLICATIONS

International Search Report and Written Opinion of the International Searching Authority for International Application No. PCT/US06/35317, mailed Feb. 26, 2007.

\* cited by examiner

*Primary Examiner* — David Dunn
*Assistant Examiner* — David E Allred
(74) *Attorney, Agent, or Firm* — Harness, Dickey & Pierce, P.L.C.

(57) ABSTRACT

A latch mechanism may include a housing, a claw rotatably supported within the housing between a latched position and an unlatched position, a first cam rotatably supported within the housing and operable to lock the claw in the latched position, and a second cam supported within the housing and slidably coupled to the first cam to selectively translate and rotate the first cam relative to the claw.

25 Claims, 8 Drawing Sheets

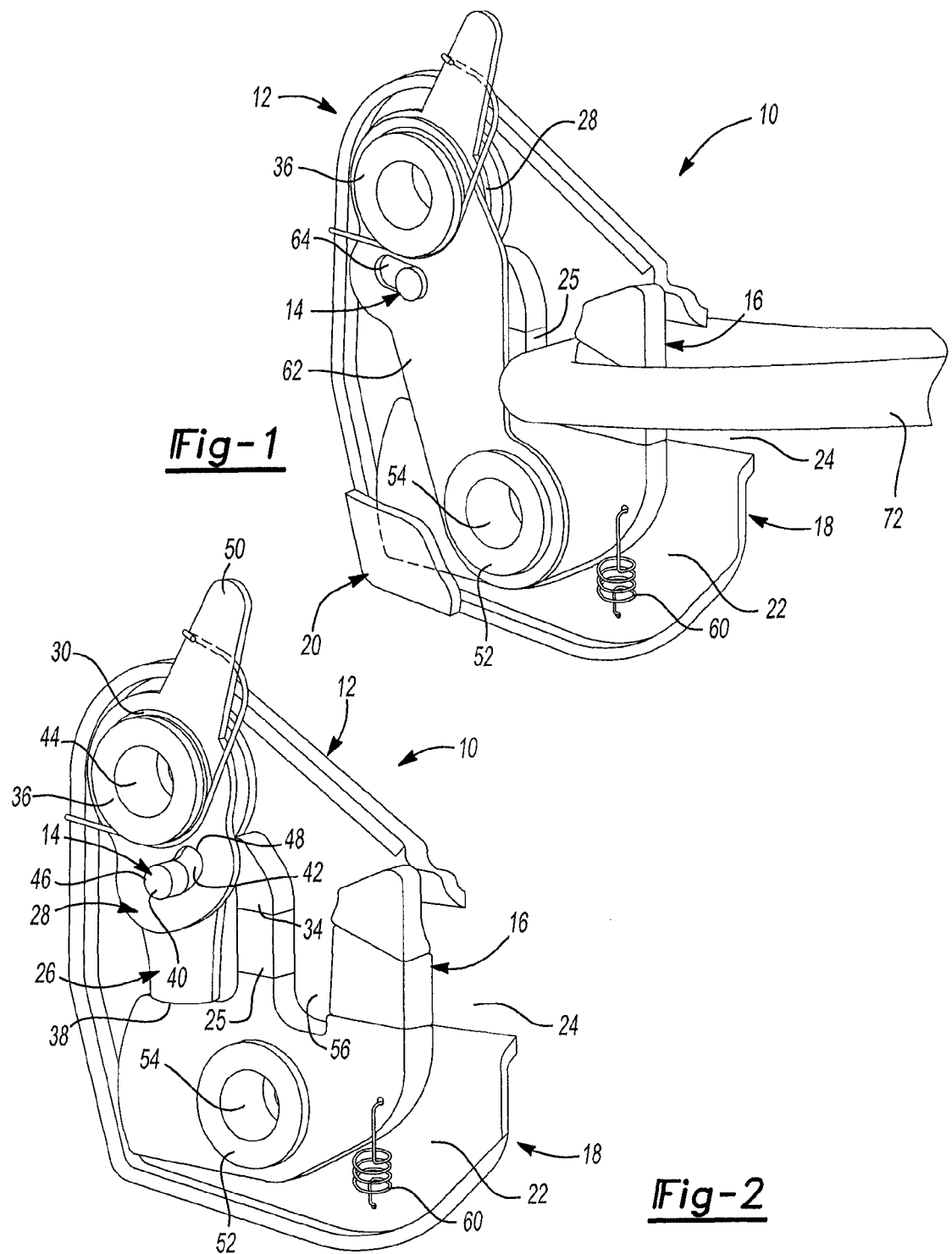

SELF-COMPENSATING MECHANICAL LATCH

CROSS-REFERENCE TO RELATED APPLICATIONS

This application is a continuation of International Application No. PCT/US2006/035317, filed Sep. 12, 2006, which claims the benefit of U.S. Provisional Application No. 60/716,379, filed Sep. 12, 2005. The disclosures of the above applications are incorporated herein by reference.

FIELD

The present teachings relate to latch mechanisms and more particularly to an improved latch mechanism for seat assemblies.

BACKGROUND

Minivans and sport utility vehicles are becoming increasingly popular and typically provide a flexible seating system capable of accommodating various seating and storage configurations. Such seating systems provide users with the ability to vary a location of a seat within a vehicle and/or to otherwise adjust the seat between a recline position, a fold-flat position, a dumped position, and/or a kneeled position.

Conventional seating systems typically include at least one latch mechanism that cooperates with a striker to prevent movement of the vehicle seat relative to the vehicle. In one application, the latch mechanism may be used to selectively prevent rotation of a seatback relative to a seat bottom. In another application, the latch mechanism may be used to prevent movement of the vehicle seat relative to a floor pan of the vehicle (i.e., rotation and/or removal). In either application, the latch mechanism prevents movement of the vehicle seat relative to the vehicle when engaged with the striker and permits movement of the vehicle seat relative to the vehicle when disengaged from the striker.

While conventional latch mechanisms adequately secure a seat assembly to a vehicle structure, such conventional latch mechanisms do not adequately compensate for small variations between the striker and latch mechanism components. Such variations may allow the seatback to move a miniscule amount even when the mechanism is locked and may cause undesirable noise and vibration.

For example, the seatback of an unoccupied seat assembly may tend to vibrate when the vehicle encounters rough road conditions, creating undesirable noise and rattling. This magnified play in a latch mechanism has been termed "chucking" and refers to any manufacturing variation or play in the mechanism components or between the mechanism components and a striker that allows movement of the seatback while the mechanism is in a latched condition. These small movements become noticeable at the upper end of the seatback and can cause discomfort to an occupant.

SUMMARY

A latch mechanism may include a housing, a claw rotatably supported within the housing between a latched position and an unlatched position, a first cam rotatably supported within the housing and operable to lock the claw in the latched position, and a second cam rotatably supported within the housing and coupled to the first cam to selectively translate and rotate the first cam relative to the claw.

The second cam may include a slot formed therein while the first cam may include a post slidably received by the slot of the second cam. The slot may position the post such that the first cam is urged into engagement with the claw when the claw is in the latched position.

The first cam may be biased into engagement with the claw and may be biased into engagement with the claw by the second cam. A biasing member may act on the second cam to bias the first cam into engagement with the claw. The claw may similarly be biased into the unlatched position by a biasing member.

The first cam may be rotatably supported within the housing by a rivet and may include an aperture rotatably receiving the rivet. The aperture may be greater than an outer perimeter of the rivet such that a clearance exists between an outer surface of the rivet and an inner surface of the aperture. The aperture may include one of a circular or oval shape.

The second cam may include an eccentric body in selective engagement with the first cam. The eccentric body may selectively contact the first cam to translate and rotate the first cam relative to the claw.

A seat assembly may include a seat bottom, a seatback rotatably supported by the seat bottom, and a latch mechanism. The latch mechanism may include a housing, a claw rotatably supported within the housing between a latched position and an unlatched position, a first cam rotatably supported within the housing and operable to lock the claw in the latched position, and a second cam rotatably supported within the housing and coupled to the first cam to rotate and translate the first cam relative to the claw.

The second cam may include a slot formed therein and the first cam may include a post slidably received by the slot of the second cam. The slot may position the post such that the first cam is urged into engagement with the claw when the claw is in the latched position. The first cam may be biased into engagement with the claw and may be biased into engagement with the claw by the second cam. A biasing member may act on the second cam to bias the first cam into engagement with the claw. The claw may similarly be biased into the unlatched position by a biasing member.

The first cam may be rotatably supported within the housing by a rivet and may include an aperture rotatably receiving the rivet. The aperture may be greater than an outer perimeter of the rivet such that a clearance exists between an outer surface of the rivet and an inner surface of the aperture. The aperture may include one of a circular or oval shape.

The latch mechanism may be disposed within the seatback to selectively prevent rotation of the seatback relative to the seat bottom when the claw is in the latched position. The latch mechanism may be disposed proximate to the seat bottom to prevent movement of the seat bottom and the seatback when the claw is in the latched position.

The second cam may include an eccentric body in selective engagement with the first cam. The eccentric body may selectively contact the first cam to translate and rotate the first cam relative to the claw.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein:

FIG. 1 is a perspective view of a latch mechanism with part of a housing removed to show the internal workings of the latch mechanism in a latched position and attached to a striker assembly;

FIG. 2 is a perspective view of the latch mechanism of FIG. 1 in a latched position;

DETAILED DESCRIPTION

Figure 3:
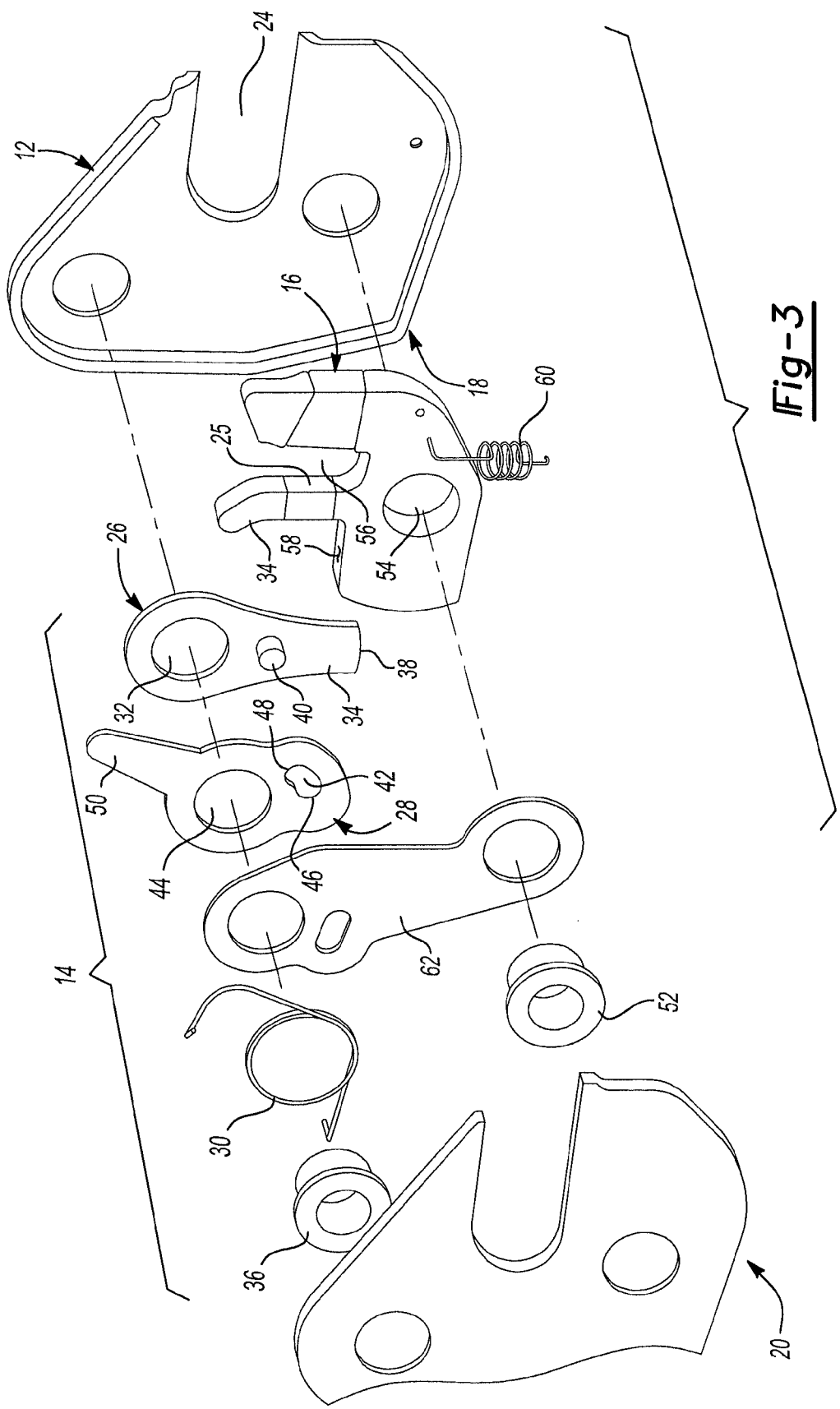
FIG. 3 is an exploded view of the latch mechanism of FIG. 1.
Figure 4:
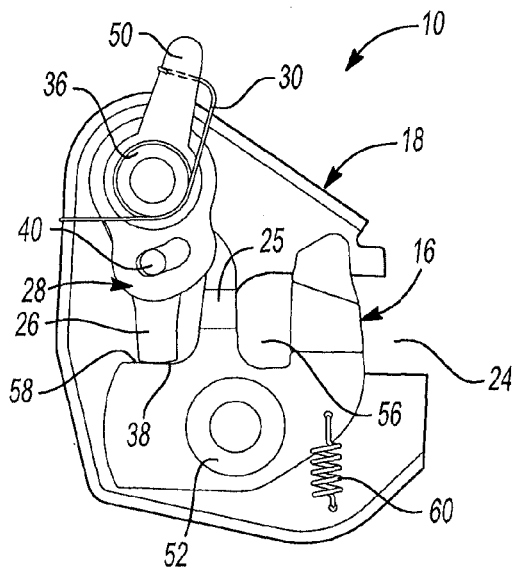
FIG. 4 is a side view of the latch mechanism of FIG. 1 in a latched position.
Figure 5:
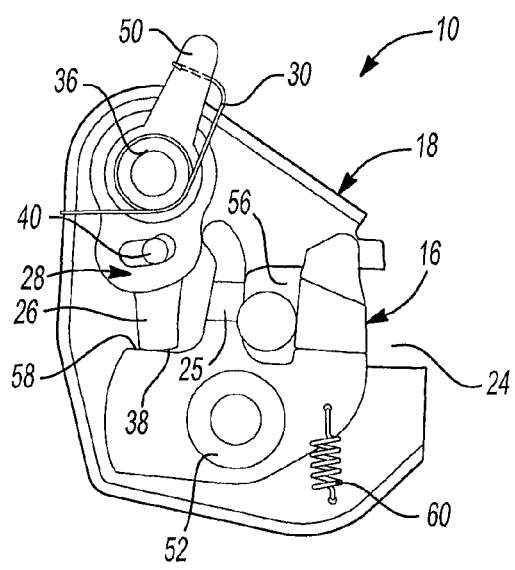
FIG. 5 is a side view of a the latch mechanism of FIG. 1 in a latched position and attached to a striker assembly.

The following description is merely exemplary in nature and is in no way intended to limit the teachings, its application, or uses.

With reference to the figures, a latch mechanism 10 is provided and includes a housing 12, a locking mechanism 14, and a claw 16. The locking mechanism 14 is rotatable relative to the housing 12 and selectively prevents rotation of the claw 16. The locking mechanism 14 is adjustable relative to the housing 12 to ensure proper engagement with the claw 16 and to prevent noise and/or vibration associated with movement between the locking mechanism 14 and the claw 16 (i.e., "chucking").

The housing 12 includes an inner housing plate 18 and an outer housing plate 20 that cooperate to define an interior space 22 and a striker recess 24. The interior space 22 houses the locking mechanism 14 and claw 16 and supports each between a latched position and an unlatched position.

Figure 11:
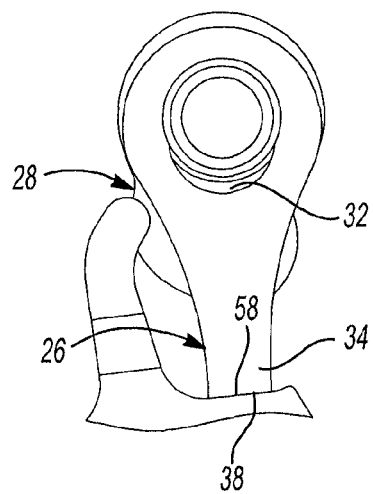
FIG. 11 is a detailed view of an adjustable locking cam of the latch mechanism of FIG. 1.

The locking mechanism 14 includes a locking cam 26, an adjustment cam 28, and a biasing member 30. The locking cam 26 includes an aperture 32 and a locking arm 34. The aperture 32 is rotatably supported within the interior space 22 of the housing 12 by a rivet 36. The aperture 32 includes an inner perimeter that is greater than an outer perimeter of the rivet 36 (FIG. 11) such that the locking cam 26 is permitted to rotate and axially move relative to the rivet 36. The aperture 32 may include any suitable shape, such as, but not limited to, a circle or oval.

The locking arm 34 generally extends away from the aperture 32 and includes an engagement surface 38 disposed on a distal end thereof and a post 40. The engagement surface 38 selectively engages the claw 16 to prevent rotation of the claw 16 relative to the housing 12. The post 40 is generally disposed between the aperture 32 and the engagement surface 38 and extends from the locking arm 34. The post 40 is slidably received by the adjustment cam 28 to selectively rotate and translate the locking cam 26 relative to the housing 12 and claw 16.

The adjustment cam 28 is rotatably supported between the inner and outer housing plates 18, 20 by the rivet 36 and includes a peanut-shaped slot 42 and a central aperture 44. The peanut-shaped slot 42 slidably receives the post 40 of the locking cam 26 and includes a first end 46 and a second end 48. The rivet 36 rotatably receives the central aperture 44 such that the adjustment cam 28 may be rotated about the rivet 36 relative to the housing 12. The adjustment cam 28 is also attached to an actuation handle 50 such that rotation of the actuation handle 50 causes concurrent rotation of the adjustment cam 28 about the rivet 36. As shown, the actuation handle 50 may be formed integrally with the adjustment cam 28.

The biasing member 30 may be a coil spring or a linear spring and is generally disposed between the adjustment cam 28 and the housing 12 to rotationally bias the adjustment cam 28 in the counterclockwise direction relative to the view shown in FIG. 1. Biasing the locking cam 26 in the counterclockwise direction relative to the view shown in FIG. 1 urges the locking cam 26 in the counterclockwise direction due to engagement between post 40 and slot 42 such that the locking cam 26 is urged into engagement with the claw 16.

The claw 16 is rotatably supported between the inner and outer housing plates 18, 20 by a rivet 52 and includes a central aperture 54, a striker recess 56, and an engagement surface 58. The central aperture 54 rotatably receives the rivet 52 such that the claw 16 rotates about the rivet 52 relative to the housing 12. The striker recess 56 is aligned with the striker recess 24 of the housing 12 when the claw 16 is in an unlatched position and is generally perpendicular to the striker recess 24 when the claw 16 is in a latched position. The striker recess 56 may include absorbing material 25 to reduce sound associated with slight movement of the claw 16 relative to a striker assembly disposed within the striker recess 56. The engagement surface 58 receives the engagement surface 38 of the locking cam 26 when the claw 16 is in the latched position to prevent the claw 16 from rotating into the unlatched position.

A biasing member 60 is disposed generally between the claw 16 and the housing 12 and biases the claw 16 in the clockwise direction relative to the view shown in FIG. 1. The biasing member 60 may be a coil spring or a linear spring and serves to apply a rotational force on the claw 16 such that the claw 16 is biased into the unlatched position.

In addition to the foregoing, the latch mechanism 10 may also include a support plate 62 supported within the interior space 22 of the housing 12. The support plate 62 includes a slot 64 that slidably receives the post 40 of the locking cam 26. Interaction between the post of the locking cam 26 and the slot 64 of the support plate 62 secures the locking cam 26 in an unlatched position.

With reference to the figures, operation of the latch mechanism 10 will be described in detail. When the claw 16 is in the latched position, the engagement surface 38 of the locking cam 26 is in contact with the engagement surface 58 of the claw 16 to prevent rotation of the claw 16 relative to the housing 12.

The engagement surface 38 is held in contact with the claw 16 due to the interaction between the biasing member 30 and the adjustment cam 28. Specifically, the biasing member 30 applies a force on the adjustment cam 28 causing the adjustment cam 28 to rotate in the counterclockwise direction relative to the view shown in FIG. 1. Rotation of the adjustment cam 28 in the counterclockwise direction causes the post 40 to traverse the peanut-shaped slot 42 from the second end 48 toward the first end 46, thereby causing the locking cam 26 to similarly rotate in the counterclockwise direction and translate towards the claw 16 until the engagement surface 38 of the locking cam 26 contacts the engagement surface 58 of the claw 16. Contact between the locking cam 26 and the claw 16 prevents the biasing member 60 from rotating the claw 16 relative to the housing 12.

Movement of the post 40 within the slot 42 (i.e., between the second end 48 and the first end 46) is defined by how far the locking cam 26 must be moved relative to the claw 16 before the engagement surface 38 of the locking cam 26 contacts the engagement surface 58 of the claw 16. If tolerances between the respective components of the locking mechanism 14 and the claw 16 are low such that there is free play in the locking mechanism 14, the locking cam 26 must translate a greater distance relative to the claw 16 until the engagement surface 38 of the locking cam 26 contacts the engagement surface 58 of the claw 16. The greater required distance results in the post 40 traveling away from the second end 48 and toward the first end 46 to move the locking cam 26 closer to the claw 16.

Alternatively, if tolerances between the respective components of the locking mechanism 14 and the claw 16 are high such that there is little free play in the locking mechanism 14, the locking cam 26 will not have to translate a great distance within the slot 42 before the engagement surface 38 of the locking cam 26 contacts the engagement surface 58 of the claw 16. Therefore, the post 40, while moving within the slot 42, will remain close to the second end 48. Allowing the locking cam 26 to translate relative to the claw 16 allows the adjustment cam 28 (via interaction between the post 40 of the locking cam 26 and the slot 42 of the adjustment cam 28) to make up for any manufacturing and/or design discrepancies between the various components of the latch mechanism 10. This relationship ensures tight engagement between the engagement surface 38 of the locking cam 26 and the engagement surface 58 of the claw 16 when the latch mechanism 10 is in the latched position. By maintaining tight engagement between the locking cam 26 and the claw 16 when the latch mechanism 10 is in the latched position, "chucking" and the associated undesirable noise can be reduced.

Rotation of the claw 16 relative to the housing 12 is accomplished by applying a rotational force to the adjustment cam 28 via actuation handle 50. Rotation of the adjustment cam 28 causes the post 40 of the locking cam 26 to traverse the peanut-shaped slot 42 from the first end 46 towards the second end 48. Movement of the post 40 along the slot 42 causes the locking cam 26 to both rotate in the clockwise direction relative to the view shown in FIG. 7 and to move axially away from the claw 16.

Figure 7:
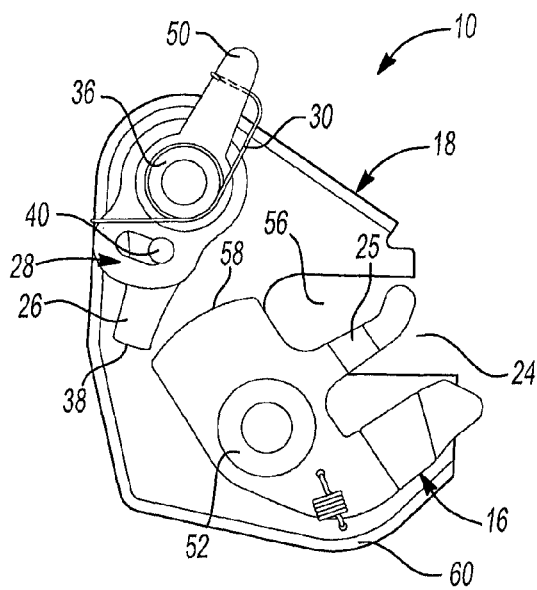
FIG. 7 is a side view of the latch mechanism of FIG. 1 in an unlatched position with a claw released from the striker assembly.
Figure 8:
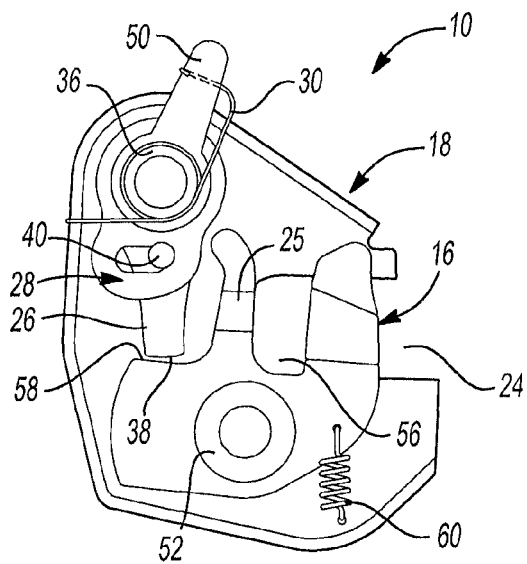
FIG. 8 is a side view of the latch mechanism of FIG. 1 in a first tolerance-absorbing phase.
Figure 9:
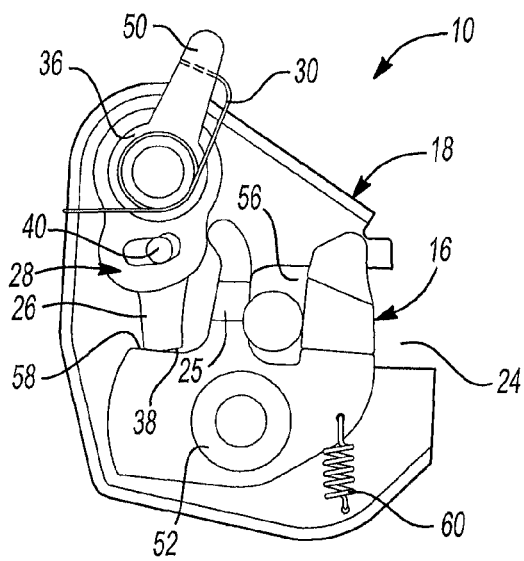
FIG. 9 is a side view of the latch mechanism of FIG. 1 in a second tolerance-absorbing phase.
Figure 10:
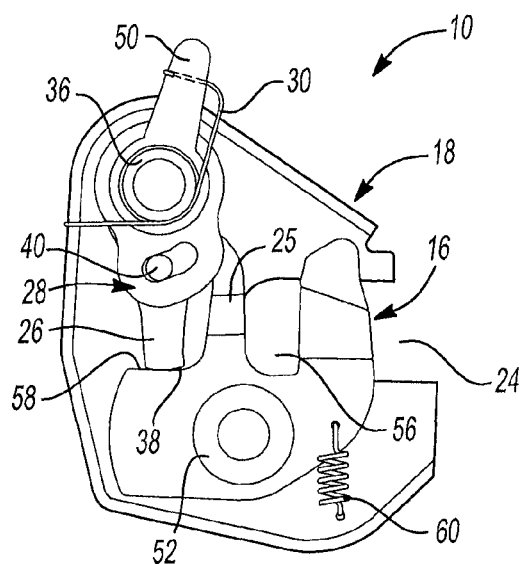
FIG. 10 is a side view of the latch mechanism of FIG. 1 in a third tolerance-absorbing phase.

Movement of the locking cam 26 away from the claw 16 causes the engagement surface 38 of the locking cam 26 to disengage the engagement surface 58 of the claw 16, thereby decreasing the force required to release the locking cam 26 from contact with the claw 16. Movement of the locking cam 26 in both the clockwise and axial directions (i.e., away from the claw 16) is accomplished due to the shape of the peanut-shaped slot 42. Once the locking cam 26 is sufficiently disengaged from the claw 16, the claw 16 can be rotated into the unlatched position by biasing member 60 (FIG. 7).

The locking cam 26 is held in the unlocked position through interaction between the post 40 and the slot 64 of the support plate 62. As such, when the claw 16 is returned to the latched position, the locking cam 26 may be rotated in the counterclockwise direction relative to the view shown in FIG. 1 and into engagement with the claw 16 once again.

Figure 6:
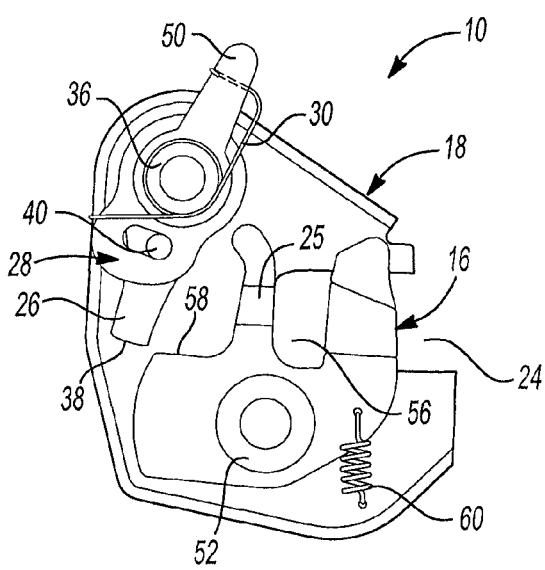
FIG. 6 is a side view of the latch mechanism of FIG. 1 in an unlatching phase showing a locking cam disengaged from a claw.

To return the claw 16 to the latched position, a force is applied to the claw 16 generally at the striker recess 56. The force causes the claw 16 to rotate relative to the housing 12 until the striker recess 56 is generally aligned with the striker recess 24 of the housing 12. Once aligned, the locking cam 26 is rotated in the counterclockwise direction relative to the view shown in FIGS. 6 and 7 until the engagement surface 38 of the locking cam 26 is in contact with the engagement surface 58 of the claw 16. Once properly engaged, the claw 16 is prevented from rotating relative to the housing 12 until a force is once again applied to the actuation handle 50.

Figure 12:
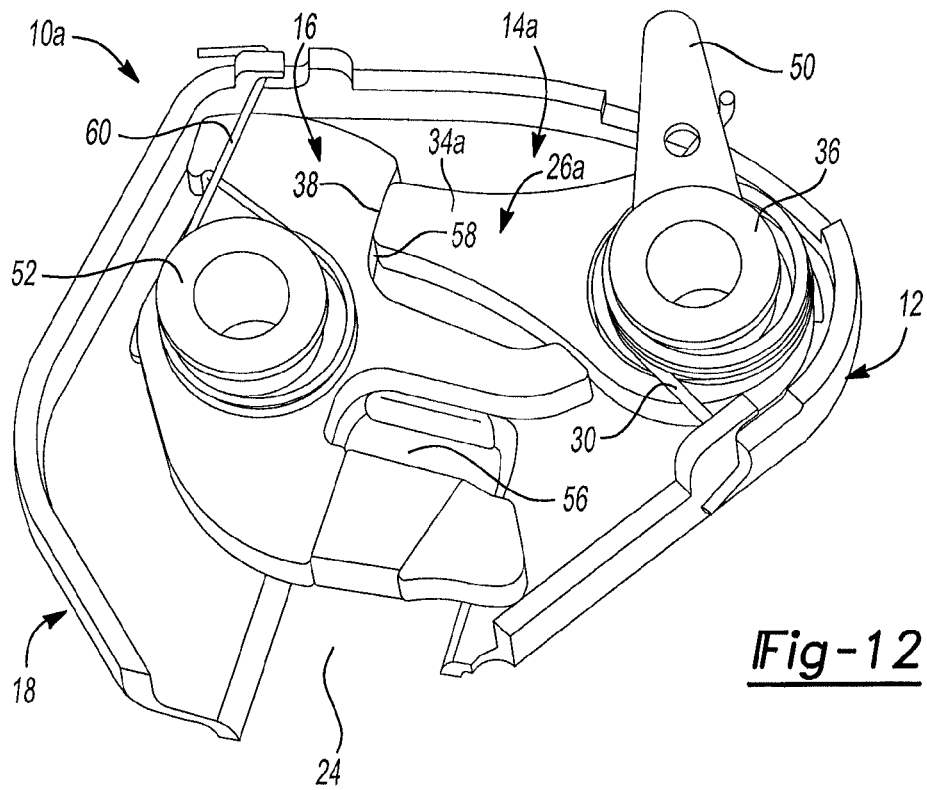
FIG. 12 is perspective view of another latch mechanism with part of a housing removed to show the internal components of the latch mechanism in a latched position.
Figure 13:
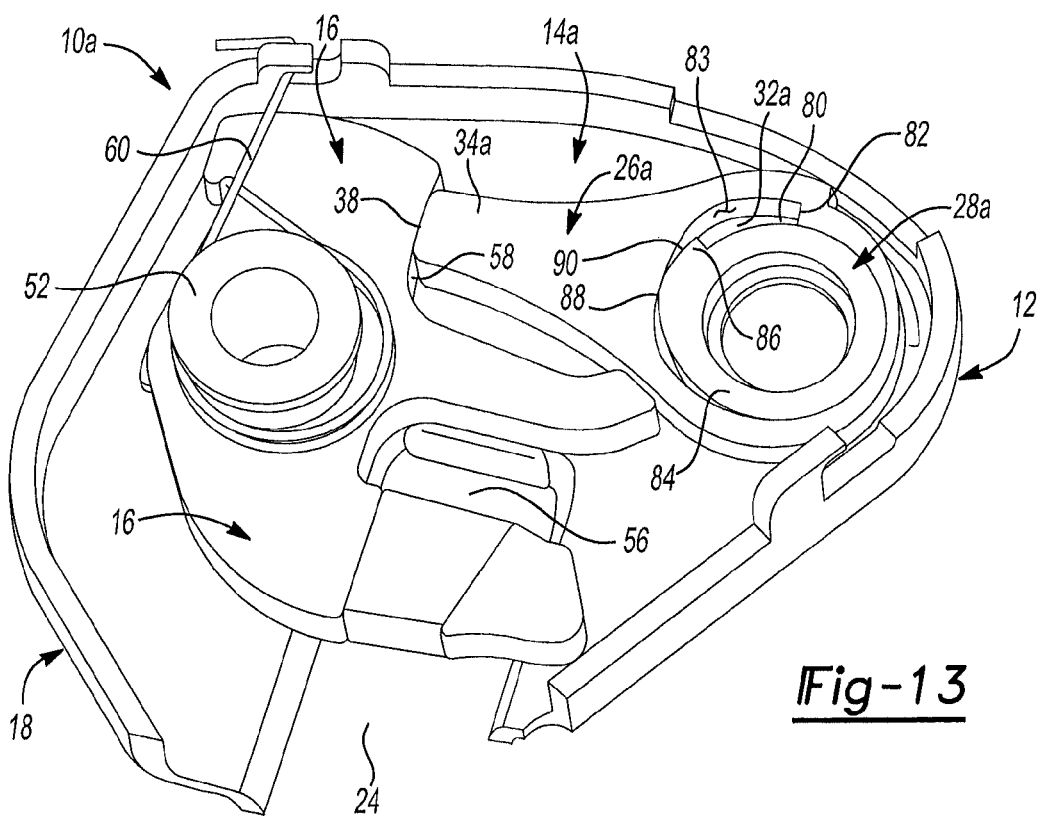
FIG. 13 is a perspective view of the latch mechanism of FIG. 12 with a release lever and a biasing element removed to show a lock cam and an adjustment cam.
Figure 14:
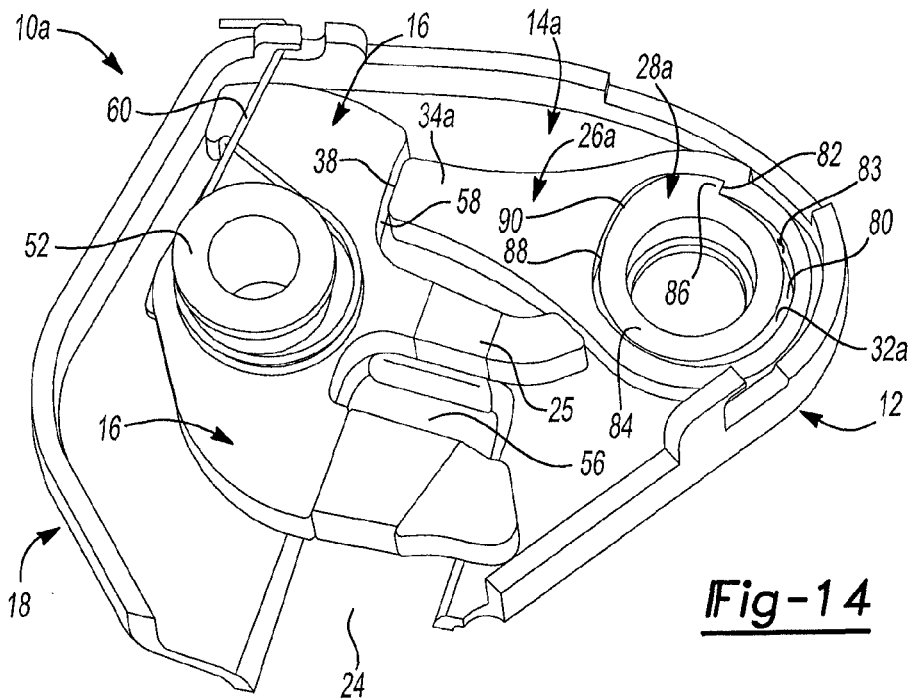
FIG. 14 is a perspective view of the latch mechanism of FIG. 13 with the adjustment cam rotated into a position allowing the adjustment cam to rotate the lock cam relative to a claw.

With reference to FIGS. 12-14, another latch mechanism 10a is provided. In view of the substantial similarity in structure and function of the components associated with the latch mechanism 10 with respect to the latch mechanism 10a, like reference numerals are used hereinafter and in the drawings to identify like components while like reference numerals containing letter extensions are used to identify those components that have been modified.

The latch mechanism 10a includes a locking mechanism 14a, a claw 16, and a housing 12 supporting the locking mechanism 14a and claw 16. The locking mechanism 14a includes a locking cam 26a and an adjustment cam 28a. The adjustment cam 28a selectively positions the locking cam 26a into engagement with the claw 16 to prevent rotation of the claw 16 relative to the housing 12.

The locking cam 26a includes a locking arm 34a and an aperture 32a. The locking arm 34a includes an engagement surface 38 at a distal end thereof while the aperture 32a includes a notch 80, a projection 82, and an engagement surface 83. The adjustment cam 28a includes an eccentric body 84 having a projection 86 extending therefrom. The projection 86 includes an arcuate surface 88 having an engagement surface 90 in selective engagement with the engagement surface 83 of the locking cam 26a.

In operation, the adjustment cam 28a is biased into engagement with the locking cam 26a by a biasing member 30. The biasing member 30 causes the adjustment cam 28a to rotate in the counterclockwise direction relative to the view shown in FIG. 13 to allow the engagement surface 90 of the adjustment cam 28a to contact the engagement surface 83 of the locking cam 26a to urge the locking cam 26a into engagement with the claw 16. As noted above with respect to the latch mechanism 10, engagement between the locking cam 26a and the claw 16 prevents the claw 16 from rotating relative to the housing 12 and therefore maintains the latch mechanism 10a in the latched position.

The eccentric body 84 of the adjustment cam 28a accounts for free play in the latch mechanism 10a and therefore reduces chucking. The eccentric body 84 includes a shape that causes the engagement surface 90 of the adjustment cam 28a to move closer to the engagement surface 83 of the locking cam 26a as the adjustment cam 28a is rotated further in the counterclockwise direction relative to the view shown in FIG. 15. If tolerances between the respective components of the locking mechanism 14a and the claw 16 are low such that there is free play in the locking mechanism 14a, the locking cam 26a must translate a greater distance relative to the claw 16 until the engagement surface 38 of the locking cam 26a contacts the engagement surface 58 of the claw 16. The greater distance mandates that the adjustment cam 28a be rotated relative to the locking cam 26a until the engagement surface 90 of the adjustment cam 28a contacts the engagement surface 83 of the locking cam 26a and urges the locking cam 26a into contact with the claw 16.

Alternatively, if tolerances between the respective components of the locking mechanism 14a and the claw 16 are high such that there is little free play in the locking mechanism 14a, the locking cam 26a will not have to translate a great distance before the engagement surface 38 of the locking cam 26a contacts the engagement surface 58 of the claw 16. Therefore, the adjustment cam 28a will not have to be rotated a great deal prior to the engagement surface 90 of the adjustment cam 28a contacting the engagement surface 83 of the locking cam 26a. This relationship ensures tight engagement between the engagement surface 38 of the locking cam 26a and the engagement surface 58 of the claw 16 when the latch mechanism 10a is in the latched position. By maintaining tight engagement between the locking cam 26a and the claw 16 when the latch mechanism 10a is in the latched position, "chucking" and the associated undesirable noise can be reduced.

To toggle the latch mechanism 10a into an unlatched position, a rotational force may be applied to the actuation handle 50 causing the actuation handle 50 to rotate in the clockwise direction relative to the view shown in FIG. 13. Sufficient rotation of the actuation handle 50 in the clockwise direction relative to the view shown in FIG. 13 causes the adjustment cam 28a to rotate and disengage the engagement surface 83 of the locking cam 26a.

Further rotation of the adjustment cam 28a in the clockwise direction relative to the view shown in FIG. 13 causes the projection 86 of the adjustment cam 28a to contact the projection 82 of the locking cam 26a to both rotate the locking cam 26a with the adjustment cam 28a and translate the locking cam 26a away from the claw 16. As noted above with respect to the latch mechanism 10, translating the locking cam 26a away from the claw 16 reduces the efforts required to rotate the actuation handle 50 and release the latch mechanism 10a. Once the locking cam 26a disengages the claw 16, the claw 16 is rotated in the clockwise direction relative to the view shown in FIG. 13 until the striker recess 56 of the claw 16 is aligned with the striker recess 24 of the housing 12.

Figure 15:
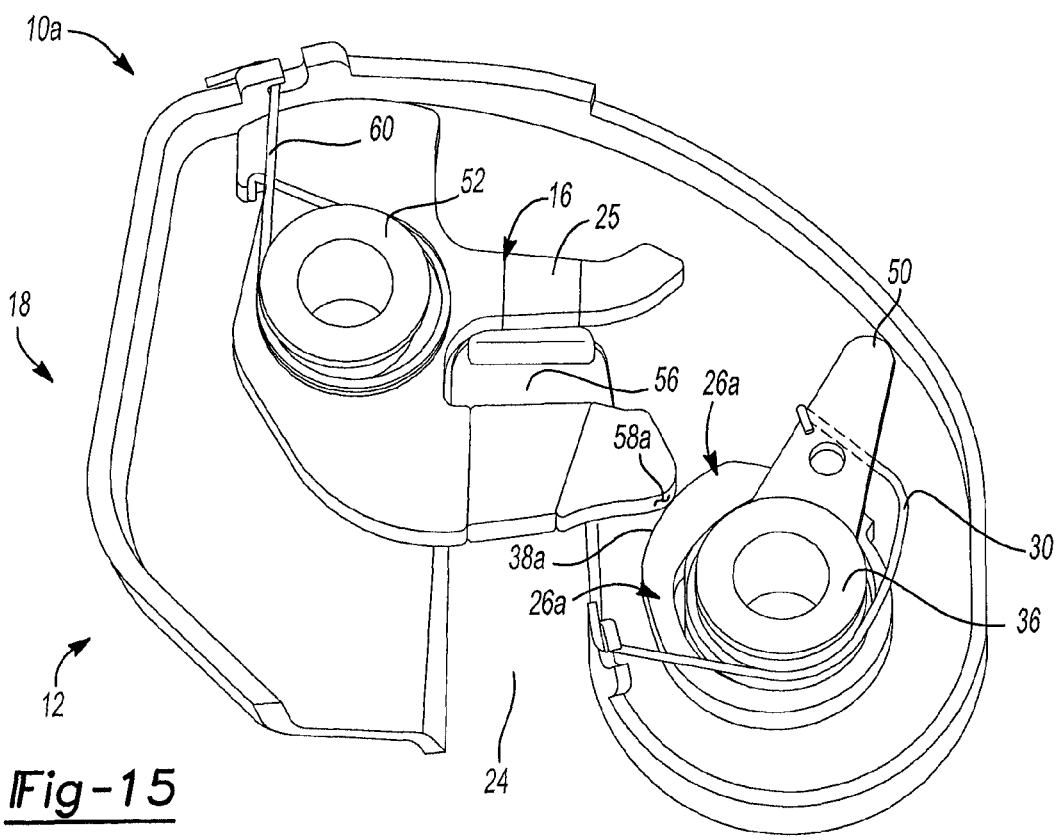
FIG. 15 is a perspective view of another latch mechanism with part of a housing removed to show the internal components of the latch mechanism in a latched position.

While each of the latch mechanisms 10, 10a are shown as contacting the claw 16 at the engagement surface 58, either of the latch mechanisms 10, 10a may contact the claw 16 at any location to selectively prevent rotation of the claw 16 relative to the housing 12. For example, the latch mechanism 10a is shown in FIG. 15 at contacting the claw 16 at an engagement surface 58a. Engagement between the engagement surface 38a of the locking cam 26a and the engagement surface 58a of the claw 16 may enhance the ability of the latch mechanism 10a to optimize the load path when the latch mechanism 10a is in the latched position.

Figure 16:
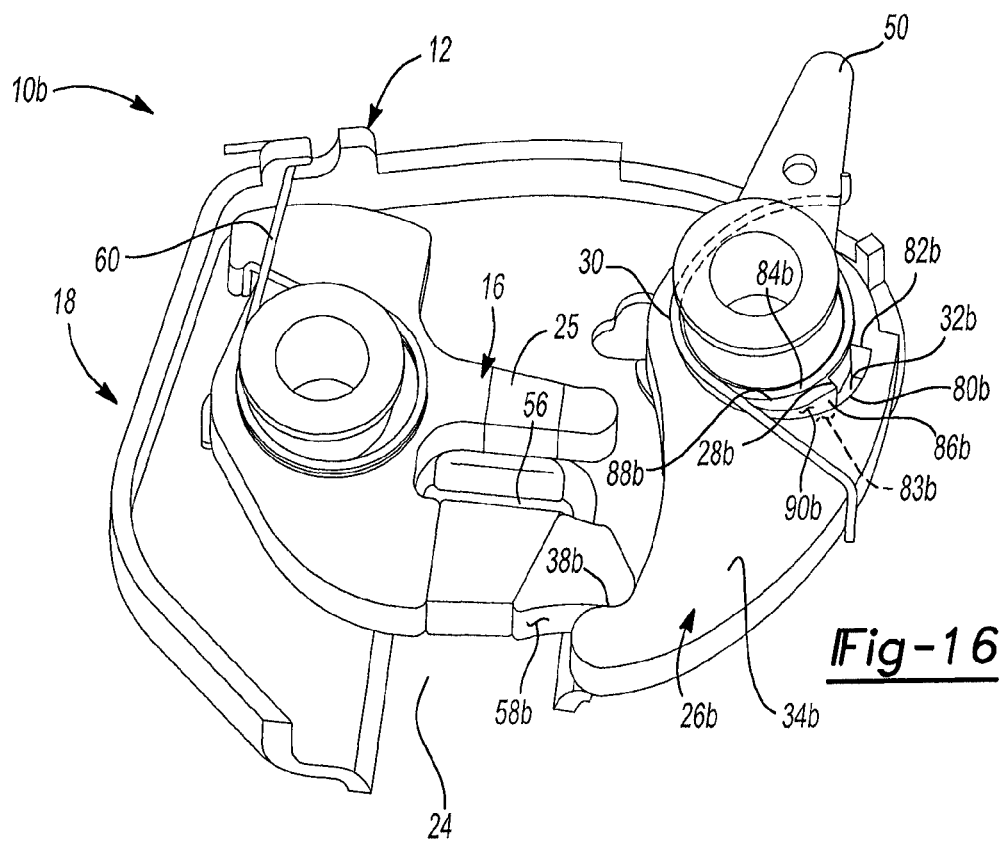
FIG. 16 is a perspective view of another latch mechanism with part of a housing removed to show the internal components of the latch mechanism in a latched position.
Figure 17:
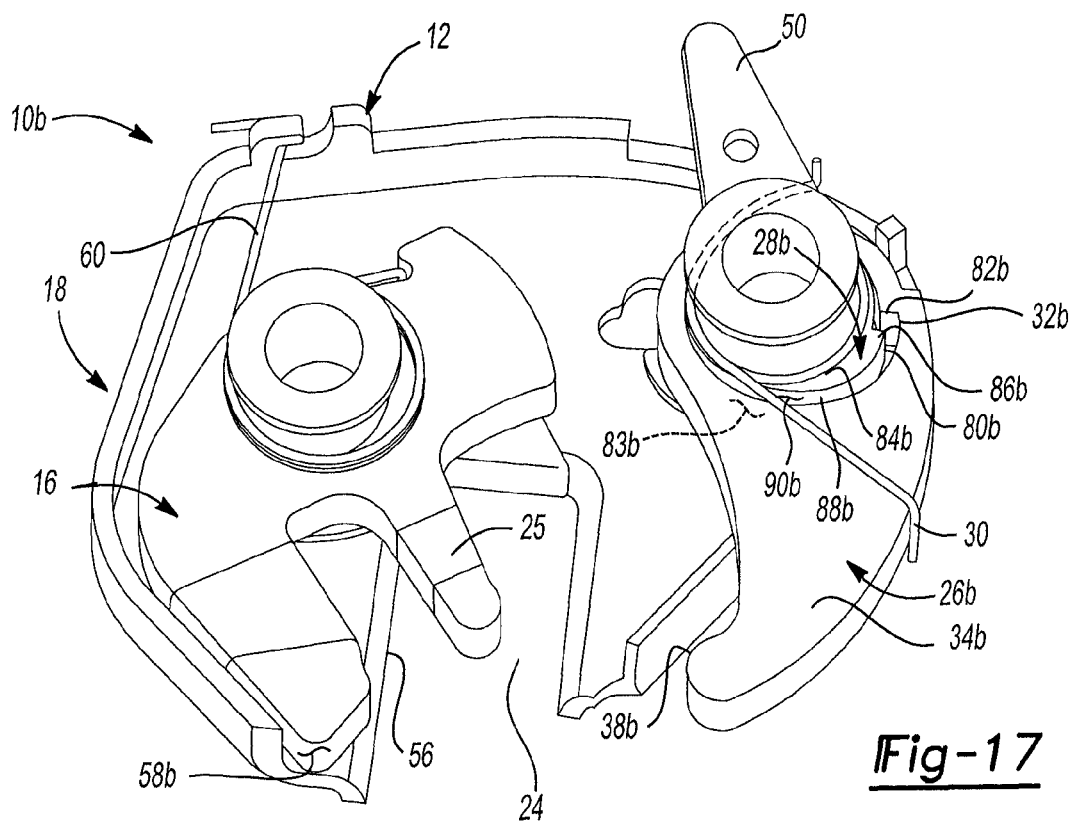
FIG. 17 is a perspective view of the latch mechanism of FIG. 16 in an unlatched position.
Figure 18:
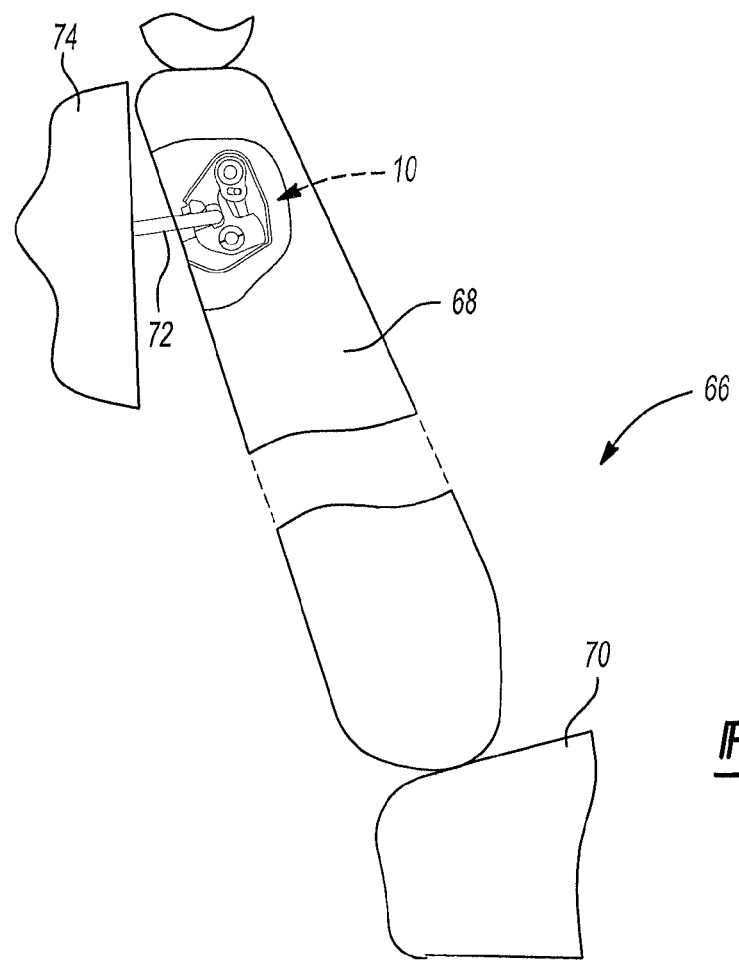
FIG. 18 is a side view of a seat assembly incorporating the latch mechanism of FIG. 1 into a seatback of the seat assembly.
Figure 19:
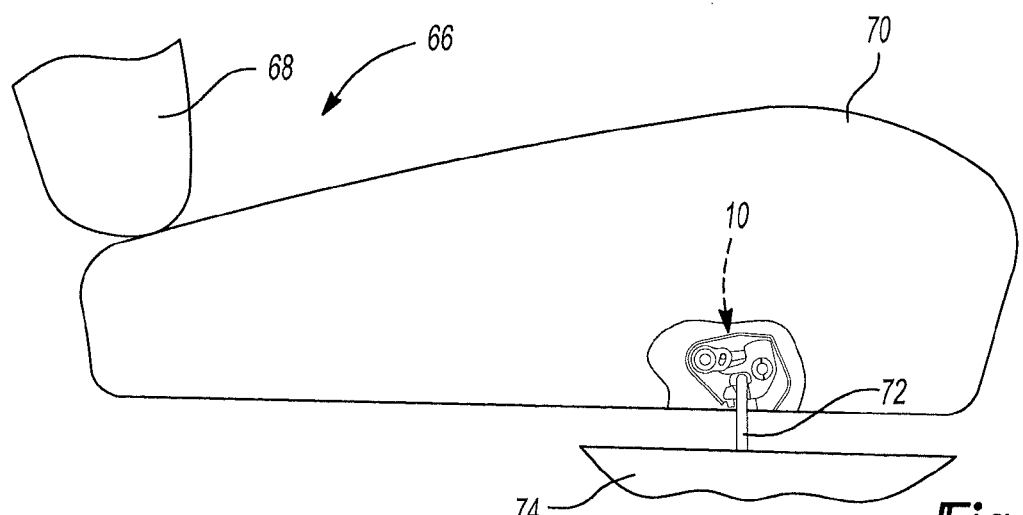
FIG. 19 is a side view of a seat assembly incorporating the latch mechanism of FIG. 1 into a seat bottom of the seat assembly.

With reference to FIGS. 16-18, another latch mechanism 10b is provided. In view of the substantial similarity in structure and function of the components associated with the latch mechanism 10 with respect to the latch mechanism 10b, like reference numerals are used hereinafter and in the drawings to identify like components while like reference numerals containing letter extensions are used to identify those components that have been modified.

The locking cam 26b includes a locking arm 34b and an aperture 32b. The locking arm 34b includes an engagement surface 38b at a distal end thereof while the aperture 32b includes a notch 80b, a projection 82b, and an engagement surface 83b. The adjustment cam 28b includes an eccentric body 84b having a projection 86b. The projection 86b includes an arcuate surface 88b having an engagement surface 90b in selective engagement with the engagement surface 83b of the locking cam 26b.

In operation, the adjustment cam 28b is biased into engagement with the locking cam 26b by a biasing member 30. The biasing member 30 causes the adjustment cam 28b to rotate in the clockwise direction relative to the view shown in FIG. 16 to allow the engagement surface 90b of the adjustment cam 28b to contact the engagement surface 83b of the locking cam 26b to urge the locking cam 26b into engagement with the claw 16. As noted above with respect to the latch mechanism 10a, engagement between the locking cam 26b and the claw 16 prevents the claw 16 from rotating relative to the housing 12 and therefore maintains the latch mechanism 10b in the latched position. In this configuration, the locking cam 26b applies a "pull" force on the claw 16 rather than applying a "push" force, as applied by the latch mechanisms 10, 10a.

The eccentric body 84b of the adjustment cam 28b accounts for free play in the latch mechanism 10b and therefore reduces chucking. The eccentric body 84b includes a shape that causes the engagement surface 90b of the adjustment cam 28b to move closer to the engagement surface 83b of the locking cam 26b as the adjustment cam 28b is rotated further in the counterclockwise direction relative to the view shown in FIG. 16. If tolerances between the respective components of the locking mechanism 14b and the claw 16 are low such that there is free play in the locking mechanism 14b, the locking cam 26b must translate a greater distance relative to the claw 16 until the engagement surface 38b of the locking cam 26b contacts the engagement surface 58b of the claw 16. The greater distances mandates that the adjustment cam 28b be rotated relative to the locking cam 26b until the engagement surface 90b of the adjustment cam 28b contacts the engagement surface 83b of the locking cam 26b and urges the locking cam 26a into contact with the claw 16.

Alternatively, if tolerances between the respective components of the locking mechanism 14b and the claw 16 are high such that there is little free play in the locking mechanism 14b, the locking cam 26b will not have to translate a great distance before the engagement surface 38b of the locking cam 26b contacts the engagement surface 58b of the claw 16. Therefore, the adjustment cam 28b will not have to be rotated a great deal prior to the engagement surface 90 of the adjustment cam 28b contacting the engagement surface 83b of the locking cam 26b. This relationship ensures tight engagement between the engagement surface 38b of the locking cam 26b and the engagement surface 58b of the claw 16 when the latch mechanism 10a is in the latched position. By maintaining tight engagement between the locking cam 26b and the claw 16 when the latch mechanism 10b is in the latched position, "chucking" and the associated undesirable noise can be reduced.

To toggle the latch mechanism 10a into an unlatched position, a rotational force may be applied to the actuation handle 50 causing the actuation handle 50 to rotate in the counter-clockwise direction relative to the view shown in FIG. 16. Sufficient rotation of the actuation handle 50 in the counter-clockwise direction relative to the view shown in FIG. 16 causes the adjustment cam 28b to rotate and disengage the engagement surface 83b of the locking cam 26b.

Further rotation of the adjustment cam 28b in the counter-clockwise direction relative to the view shown in FIG. 16 causes the projection 86b of the adjustment cam 28b to contact the projection 82b of the locking cam 26b to both rotate the locking cam 26b with the adjustment cam 28b and translate the locking cam 26b away from the claw 16. As noted above with respect to the latch mechanism 10a, translating the locking cam 26b away from the claw 16 reduces the efforts the must be applied to the actuation handle 50 to release the latch mechanism 10b. Once the locking cam 26b disengages the claw 16, the claw 16 is rotated in the clockwise direction relative to the view shown in FIG. 16 until the striker recess 56 of the claw 16 is aligned with the striker recess 24 of the housing 12.

With reference to the figures, the latch mechanism 10 is shown incorporated into a seat assembly 66 having a seatback 68 rotatably supported by a seat bottom 70. While any of the foregoing latch mechanisms 10, 10a, 10b could be incorporated into the seat assembly 66, the latch mechanism 10 will be shown hereinafter in the drawings as being associated with the seat assembly 66.

The latch mechanism 10 may be disposed generally within the seatback 68 for selective engagement with a striker 72 (i.e., within striker recesses 24, 56) to prevent rotation of the seatback 68 relative to the seat bottom 70 or may be associated with the seat bottom 70 to prevent rotation and/or removal of the seat bottom 70 from a vehicle 74.

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A latch mechanism comprising:
   a housing;
   a claw rotatably supported within said housing between a latched position and an unlatched position;
   a first cam rotatably and translatably supported about an axis within said housing and operable to lock said claw in said latched position; and
   a second cam rotatably supported about said axis within said housing and coupled to said first cam by a cam mechanism, said cam mechanism configured to translate said first cam and rotate said first cam about said axis into engagement with said claw to maintain said claw in said latched position and said cam mechanism configured to translate and rotate said first cam out of said engagement with said claw to permit movement of said claw into said unlatched position.

2. The latch mechanism of claim 1, wherein said cam mechanism includes a slot and a post.

3. The latch mechanism of claim 2, wherein said first cam includes one of said slot and said post and said second cam includes the other of said post and said slot, said post slidably received by said slot.

4. The latch mechanism of claim 3, wherein said slot positions said post such that said first cam is urged into engagement with said claw when said claw is in said latched position.

5. The latch mechanism of claim 1, wherein said first cam is biased into engagement with said claw.

6. The latch mechanism of claim 1, wherein said first cam is biased into engagement with said claw by said second cam.

7. The latch mechanism of claim 6, further comprising a biasing member acting on said second cam to bias said first cam into engagement with said claw.

8. The latch mechanism of claim 1, wherein said claw is biased into said unlatched position by a biasing member.

9. The latch mechanism of claim 1, wherein an aperture of said first cam is rotatably supported by a journal having an outer diameter, said aperture having an inner diameter greater than said outer diameter of said journal such that a clearance exists between an outer surface of said journal and an inner surface of said aperture.

10. The latch mechanism of claim 9, wherein said aperture is circular.

11. A seat assembly comprising:
    a seat bottom;
    a seatback rotatably supported by said seat bottom; and
    a latch mechanism comprising:
      a housing;
      a claw rotatably supported within said housing between a latched position and an unlatched position;
      a first cam rotatably and translatably supported about an axis within said housing and operable to lock said claw in said latched position; and
      a second cam rotatably supported about said axis within said housing and coupled to said first cam by a cam mechanism, said cam mechanism configured to translate said first cam and rotate said first cam about said axis into engagement with said claw to maintain said claw in said latched position and said cam mechanism configured to translate and rotate said first cam out of said engagement with said claw to permit movement of said claw into said unlatched position.

12. The seat assembly of claim 11, wherein said cam mechanism includes a slot and a post.

13. The seat assembly of claim 12, wherein said first cam includes one of said slot and said post and said second cam includes the other of said post and said slot, said post slidably received by said slot.

14. The seat assembly of claim 13, wherein said slot positions said post such that said first cam is urged into engagement with said claw when said claw is in said latched position.

15. The seat assembly of claim 11, wherein said first cam is biased into engagement with said claw.

16. The seat assembly of claim 11, wherein said first cam is biased into engagement with said claw by said second cam.

17. The seat assembly of claim 16, further comprising a biasing member acting on said second cam to bias said first cam into engagement with said claw.

18. The seat assembly of claim 11, wherein said claw is biased into said unlatched position by a biasing member.

19. The seat assembly of claim 11, wherein an aperture of said first cam is rotatably supported by a journal having an outer diameter, said aperture having an inner diameter greater than said outer diameter of said journal such that a clearance exists between an outer surface of said journal and an inner surface of said aperture.

20. The seat assembly of claim 19, wherein said aperture is circular.

21. The seat assembly of claim 11, wherein said latch mechanism is disposed within said seatback to selectively prevent rotation of said seatback relative to said seat bottom when said claw is in said latched position.

22. The seat assembly of claim 11, wherein said latch mechanism is disposed proximate to said seat bottom to prevent movement of said seat bottom and said seatback when said claw is in said latched position.

23. A latch mechanism comprising:
- a housing;
- a claw rotatably supported within said housing between a latched position and an unlatched position;
- a first cam rotatably and translatably supported about a rivet within said housing and operable to lock said claw in said latched position; and
- a second cam rotatably supported about said rivet within said housing and coupled to said first cam by a cam mechanism, said cam mechanism configured to translate said first cam and rotate said first cam relative to said rivet and about an axis of rotation of said first cam into engagement with said claw to maintain said claw in said latched position and said cam mechanism configured to translate and rotate said first cam relative to said rivet out of said engagement with said claw to permit movement of said claw into said unlatched position.

24. The latch mechanism of claim 23, wherein translation of said first cam causes translation of a central axis of said first cam.

25. The latch mechanism of claim 23, wherein said first cam includes an aperture rotatably receiving said rivet, said aperture being larger than an outer diameter of said rivet.

* * * * *